US011570019B2

(12) United States Patent
Gould (10) Patent No.: US 11,570,019 B2
(45) Date of Patent: Jan. 31, 2023

(54) HOME AUTOMATION SYSTEM INCLUDING OPERATION BASED CONTEXTUAL INFORMATION COMMUNICATIONS AND RELATED METHODS

(71) Applicant: K4CONNECT INC., Raleigh, NC (US)

(72) Inventor: Jonathan Andrew Gould, Raleigh, NC (US)

(73) Assignee: K4CONNECT INC., Raleigh, NC (US)

( * ) Notice: Subject to any disclaimer, the term of this patent is extended or adjusted under 35 U.S.C. 154(b) by 0 days.

(21) Appl. No.: 16/176,282

(22) Filed: Oct. 31, 2018

(65) Prior Publication Data

US 2019/0173688 A1 Jun. 6, 2019

Related U.S. Application Data

(60) Provisional application No. 62/595,121, filed on Dec. 6, 2017.

(51) Int. Cl.
*H04L 12/28* (2006.01)
*H04L 67/12* (2022.01)
*H04W 4/021* (2018.01)

(52) U.S. Cl.
CPC ........ *H04L 12/2829* (2013.01); *H04L 12/282* (2013.01); *H04L 67/12* (2013.01); *H04W 4/021* (2013.01); *H04L 2012/2841* (2013.01)

(58) Field of Classification Search
CPC ............... H04L 12/2829; H04L 12/282; H04L 2012/2841; H04L 67/12; H04W 4/021
See application file for complete search history.

(56) References Cited

U.S. PATENT DOCUMENTS

2005/0120223 A1* 6/2005 Kiwimagi ............... G06F 21/33
713/182
2006/0066448 A1* 3/2006 Berisford ............... G06Q 50/22
340/504

(Continued)

OTHER PUBLICATIONS

Patrick Moorhead, The Problem With Home Automation's Internet Of Things (IoT), Forbes, Sep. 26, 2013.

*Primary Examiner* — John A Follansbee
*Assistant Examiner* — Fadi Haj Said
(74) *Attorney, Agent, or Firm* — Allen, Dyer, Doppelt + Gilchrist, P.A.

(57) ABSTRACT

A home automation (HA) system may include, within a senior living facility, a cloud server, HA operation devices and HA user interface devices for respective users. Each HA user interface device may wirelessly communicate with the HA operation devices and the cloud server. HA hub devices may provide communications for the HA user interface devices, the HA operation devices, and the cloud server. A caregiver interface device may cooperate with the cloud server to display contextual information for a respective user. The cloud server may cooperate with the caregiver interface device to determine when the caregiver interface device is within a room in the senior living facility associated with the respective user, and when so, determine a current operation of a given HA operation device, determine the contextual information based upon the current operation of the given HA operation device, and communicate the contextual information to the caregiver interface device.

28 Claims, 3 Drawing Sheets

(56) References Cited

U.S. PATENT DOCUMENTS

| | | | |
|---|---|---|---|
| 2006/0124655 A1* | 6/2006 | Ratnakar | G07F 11/44 221/3 |
| 2006/0139312 A1* | 6/2006 | Sinclair, II | G06F 3/0481 345/156 |
| 2010/0195489 A1* | 8/2010 | Zhou | H04L 12/433 370/216 |
| 2011/0010646 A1* | 1/2011 | Usey | A61F 4/00 715/762 |
| 2012/0095779 A1* | 4/2012 | Wengrovitz | G16H 10/60 705/3 |
| 2014/0098247 A1* | 4/2014 | Rao | H04L 67/125 455/420 |
| 2015/0109442 A1* | 4/2015 | Derenne | H04N 7/185 348/143 |
| 2015/0112899 A1* | 4/2015 | Dagum | A61B 5/6898 706/12 |
| 2016/0029884 A1* | 2/2016 | Kockan | A61B 3/0033 351/239 |
| 2017/0006533 A1 | 1/2017 | Gould et al. | |
| 2017/0053540 A1* | 2/2017 | Meagher | G09B 5/00 |
| 2017/0102681 A1* | 4/2017 | Verhoeven | G05B 17/02 |
| 2017/0186301 A1* | 6/2017 | Vaddepally | H04W 4/90 |
| 2017/0339435 A1* | 11/2017 | Swan | H04N 21/2343 |
| 2018/0034321 A1* | 2/2018 | Tole | H02J 50/40 |
| 2018/0213361 A1* | 7/2018 | Venkat | G16H 40/20 |
| 2018/0342329 A1* | 11/2018 | Rufo | G08B 25/10 |

\* cited by examiner

HOME AUTOMATION SYSTEM INCLUDING OPERATION BASED CONTEXTUAL INFORMATION COMMUNICATIONS AND RELATED METHODS

RELATED APPLICATION

The present application is based upon provisional application Ser. No. 62/595,121, filed Dec. 6, 2017, the entire contents of which is hereby incorporated by reference.

TECHNICAL FIELD

The present embodiments are directed to the field of electronics, and more particularly to home automation systems and related methods.

BACKGROUND

There are a number of home automation systems and approaches that seek to permit automated control of electrical devices in a house. The popularity of home automation has been increasing due to the greater availability of smartphones and tablets. As noted in "The Problem With Home Automation's Internet Of Things (IoT)", an article appearing in Forbes dated Sep. 26, 2013, home automation was typically for wealthy consumers with an expensive system to control lights, home theater, security, air conditioning, and home audio. This market has expanded with many do it yourself (DIY) products now available, and, although the products are useful, they may be difficult to aggregate. In other words, as explained in the article, difficulties could arise if a consumer bought a Nest thermostat, Kwikset door lock, Phillips Hue lighting device, Lutron light switch, Sonos audio system, and Belkin wireless plugs. The consumer would need to have multiple applications each requiring time to setup, learn, and use. Additionally, the article states that there is no easy way to make devices work together, such as if the consumer wanted to trigger one event using one device based on another event from another device.

Multiple communication protocols may also be problematic. In particular, different devices may operate using different communication protocols, for example, Wifi, Zigbee, Zwave, Insteon, Itron, RadioRA2, and others. This may create additional difficulties for home automation.

One approach to address these shortcomings is for the consumer, which may include a user and/or enterprise, to use a service and device aggregator that provides one application and a consolidated wireless adapter unit. The user would contract with such a provider for multiple years. Unfortunately, as noted in the article, the consumer may not benefit from the most advanced hardware and software.

Another approach, as noted in the Forbes article, is to provide a single application that attempts to consolidate disparate applications and consolidate wireless adaptors, for example, using each of the different communications protocols. However, such aggregation or single application approaches may not fully utilize and efficiently present data from available devices, for example, in a user context. Accordingly, further improvements to the operation of home automation devices may be desirable.

SUMMARY

A home automation (HA) system for a senior living facility may include a cloud server, a plurality of HA operation devices within the senior living facility, and a plurality of HA user interface devices for respective users within the senior living facility. Each HA user interface device may be configured to wirelessly communicate with at least one of the plurality of HA operation devices and the cloud server. The HA system may also include a plurality of HA hub devices within the senior living facility to provide communications for the plurality of HA user interface devices, the plurality of HA operation devices, and the cloud server. The HA system may further include at least one caregiver interface device configured to cooperate with the cloud server to display contextual information for a respective user. The cloud server may be configured to cooperate with the at least one caregiver interface device to determine when the at least one caregiver interface device is within a room in the senior living facility associated with the respective user, and when so, determine a current operation of at least one given HA operation device, determine the contextual information for the respective user based upon the current operation of the at least one given HA operation device, and communicate the contextual information to the at least one caregiver interface device.

At least one of the plurality of HA operation devices may include a medication container associated with the respective user, for example. The contextual information may include medication usage information, and the cloud server may be configured to communicate the contextual information based upon operation of the medication container.

At least one of the plurality of HA operation devices may include a light switch in an area in the senior living facility, for example. The contextual information may include activities for the respective user within the area, and the cloud server is configured to communicate the contextual information to the at least one caregiver interface device based upon operations of the light switch.

The area may include a bedroom, and the contextual information may include sleep information, for example. The area may include a bathroom, and the contextual information may include bathroom usage information, for example.

At least one of the plurality of HA operation devices may include an occupancy sensor in an area in the senior living facility, and the contextual information may include physical activities for the respective user within the area, for example. The cloud server may be configured to communicate the contextual information to the at least one caregiver interface device based upon operations of the occupancy sensor, for example.

The area may include a shower, for example. The contextual information may include shower usage information.

The cloud server may be configured to communicate a notification to a respective HA user interface device based upon the contextual information. The notification may include a reminder for the respective user to perform an action associated with the contextual information, for example.

The cloud server may be configured to learn the contextual information based upon at least one of the plurality of HA operation devices over time. The cloud server may be configured to learn the contextual information based upon input to the at least one caregiver interface device, for example.

The plurality of HA user interface devices may include a plurality of tablet computers. The plurality of HA operation devices may include a plurality of internet of things (IoT) devices, for example.

The contextual information may include health information for the respective user. The contextual information may include family member information for the respective user, for example.

A method aspect is directed to a method of communicating contextual information to at least one caregiver interface device in a home automation (HA) system for a senior living facility. The HA system includes a cloud server, a plurality of HA operation devices within the senior living facility, and a plurality of HA user interface devices for respective users within the senior living facility. Each HA user interface device may be configured to wirelessly communicate with at least one of the plurality of HA operation devices and the cloud server. The HA system may also include a plurality of HA hub devices within the senior living facility to provide communications for the plurality of HA user interface devices, the plurality of HA operation devices, and the cloud server. The method may include using the at least one caregiver interface device to cooperate with the cloud server to display the contextual information for a respective user. The method may also include using the cloud server to cooperate with the at least one caregiver interface device to determine when the at least one caregiver interface device is within a room in the senior living facility associated with the respective user, and when so, determine a current operation of at least one given HA operation device, determine the contextual information for the respective user based upon the current operation of the at least one given HA operation device, and communicate the contextual information to the at least one caregiver interface device.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
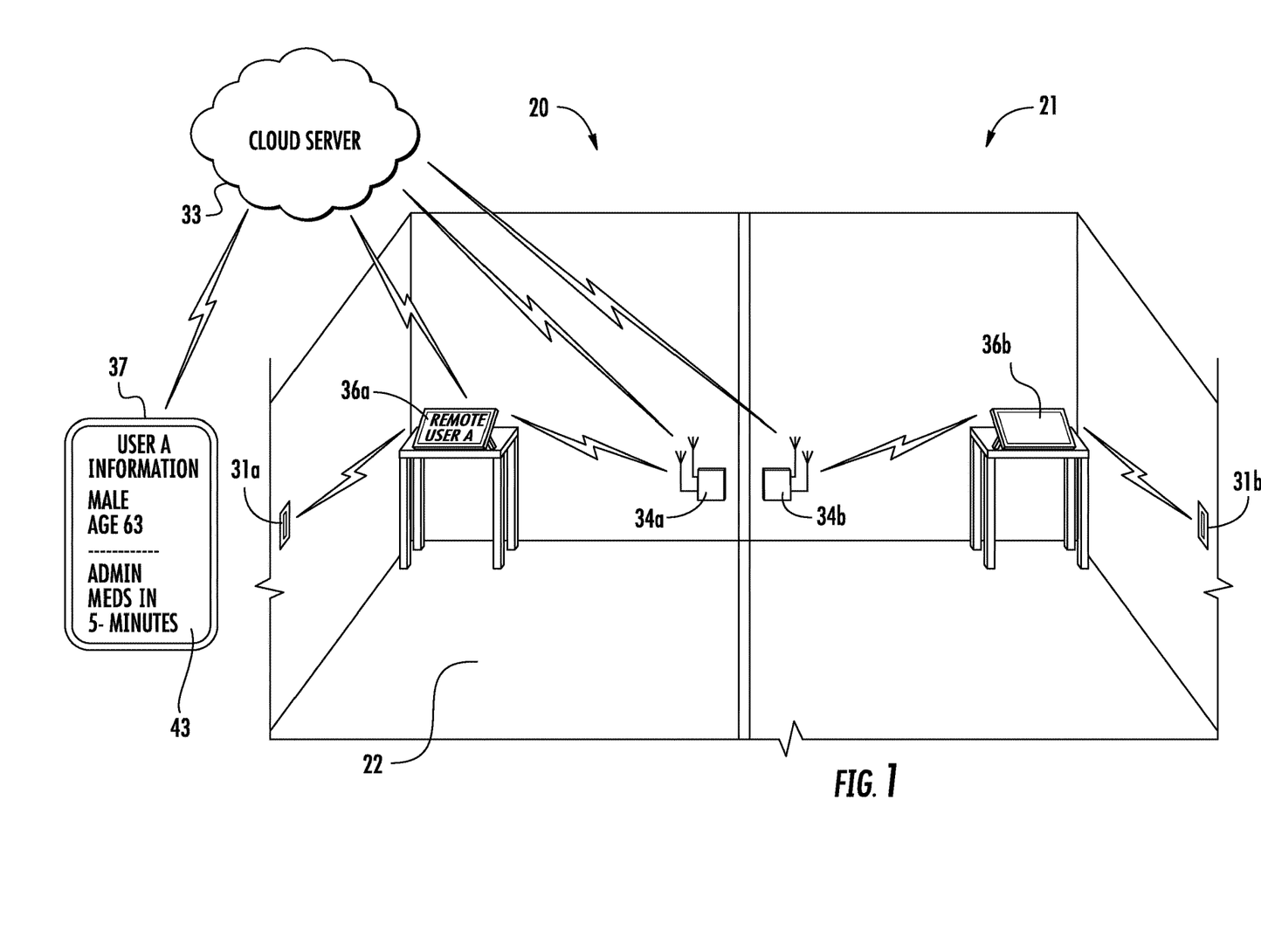
FIG. 1 is a diagram of a senior living facility including an HA system in accordance with an embodiment.
Figure 2:
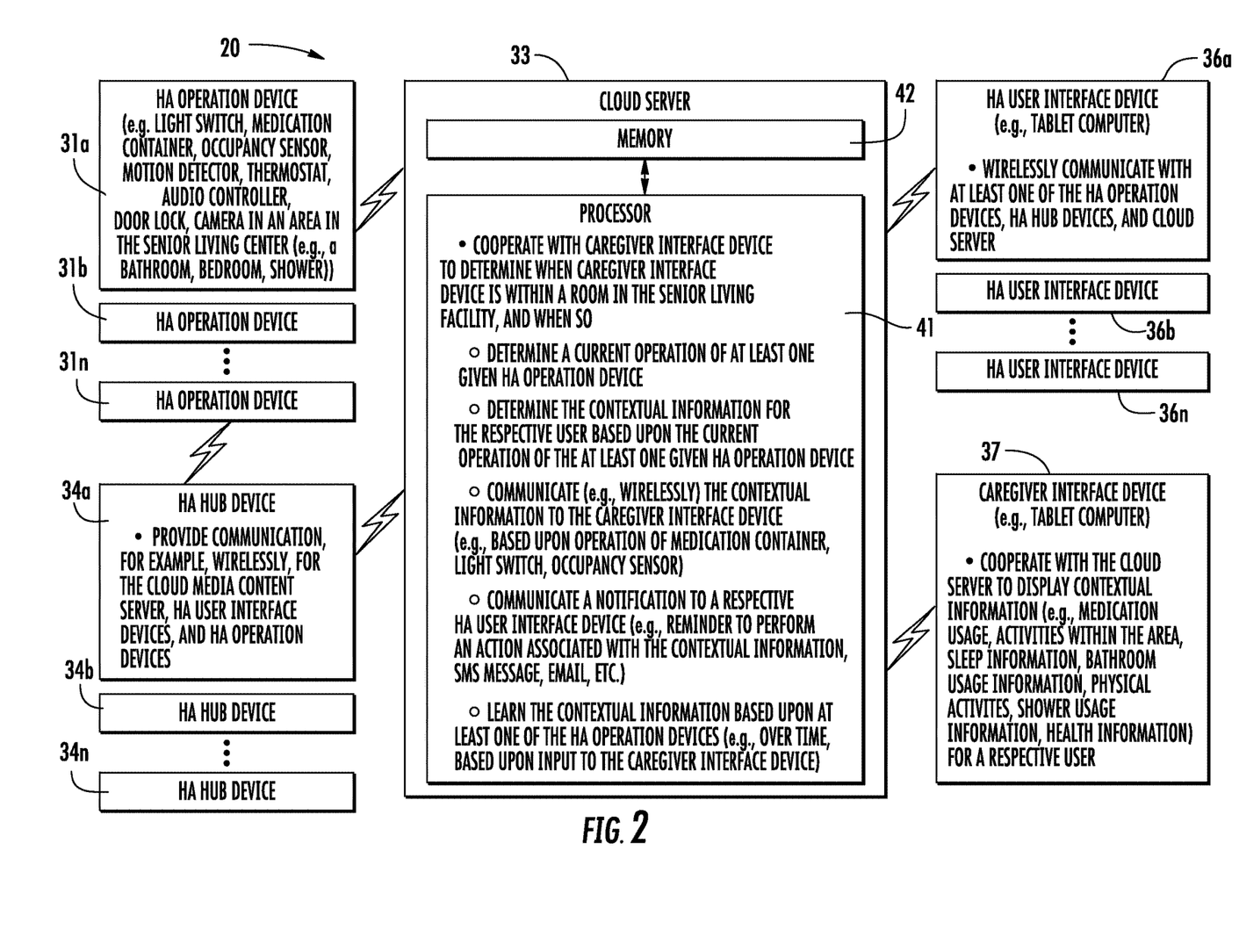
FIG. 2 is a schematic diagram of an HA system in accordance with an embodiment.

Referring initially to FIGS. 1 and 2, a home automation (HA) system 20 illustratively includes a cloud server 33. The cloud server 33 includes a processor 41 and a memory 42 coupled thereto. While operations of the cloud server 33 are described herein, it will appreciated by those skilled in the art that the operations are being performed by the processor 41 in cooperation with the memory 42. The cloud server 33 may store media content for distribution, for example, documents, photos, videos, data feeds, etc. The cloud server 33 may also process operations for HA devices, as will be described in further detail below. The cloud server 33 may also function as a gateway to permit operation of HA operation devices 31a-31n from outside a senior living facility 21 or internal network (i.e., over the Internet).

The HA operation devices 31a-31n of the HA system 20 are within the senior living facility 21. The senior living facility 21 may include living rooms for members of the senior living facility. Of course, while a senior living facility 21 is described, the HA system 20 may be used within another type of structure, for example, a hospital, a home, and a commercial, residential, and/or educational campus, etc.

The HA operation devices 31a-31n may include a light switch in a room or area 22 in the senior living facility 21, a thermostat, a motion detector, an audio controller, a door lock, and a camera, for example. The HA operation devices 31a-31n may also include a medication container or pill dispenser. The HA operation devices 31a-31n may include other and/or additional types of devices, for example, internet of things (IoT) devices.

The HA system 20 also includes HA user interface devices 36a-36n for respective users within the structure or senior living facility 21. The HA user interface devices 36a-36n may be in the form of tablet computers, for example. Each HA user interface device 36a-36n may be another or different type of HA user interface device, for example, a smartphone, a laptop or personal computer, and/or television interface or streaming device.

Each HA user interface device 36a-36n is configured to wirelessly communicate with at least one of the HA operation devices 31a-31n and the cloud server 33, for example, to perform at least one HA operation. For example, a given HA user interface device 36a-36n may be used, based upon input thereto, to control a light switch in a room in the senior living facility 21, control a thermostat, communicate with a motion detector, control an audio controller, control a door lock, and communicate with a camera.

The HA system 20 further includes HA hub devices 34a-34n within the structure or senior living facility 21. The HA hub devices 34a-34n provide communications for the cloud server 33, the HA user interface devices 36a-36n, and the HA operation devices 31a-31n. More particularly, a respective HA hub device 34a-34n may be in each area or room of the senior living facility 21 and communicate with a corresponding HA user interface device 36a-36n. With respect to the senior living facility example noted above, each member of the senior living facility may have an HA user interface device 36a-36n and an HA hub device 34a-34n within their room. The HA user interface device 36a-36n may communicate with the HA hub device 34a-34n to control respective HA operation devices 31a-31n. The HA hub device 34a-34n may be considered a bridge between respective HA operation devices 31a-31n and the corresponding HA user interface device 36a-36n.

An HA user interface device 36a-36n may communicate with the cloud server 33 to retrieve updated data or media content from the Internet, for example, or uploaded to the cloud server. Of course, the HA user interface device 36a-36n may communicate with either or both of the corresponding HA hub device 34a-34n and cloud server 33 to download or retrieve data and/or media. The HA user interface device 36a-36n may also upload data, for example, to the cloud server 33. With respect to the senior living example, the HA user interface device 36a-36n may upload or communicate usage data and/or other data, for example, cognitive data to be used by staff for determining a user health level and/or a user activity level. Further details of an exemplary HA system are described in U.S. Patent Application Publication No. 2017/0006533, assigned to the present assignee, and the entire contents of which of herein incorporated by reference.

The HA system 20 also includes a caregiver interface device 37 associated with a caregiver for one or more respective users within the senior living facility 21. The caregiver interface device 37 may be similar to the HA user interface devices 36a-36n and be in the form of a tablet computer. Of course, the caregiver interface device 37 may be another type of device, for example, a mobile telephone. There may be more than one caregiver interface device 37. The caregiver interface device 37 cooperates with the cloud server 33 to display contextual information for a respective user. Further details of the caregiver interface device 37 with respect to HA operation devices 31a-31n, and more particularly, the contextual information, will now be described.

With respect to the senior living facility 21, it may be particularly desirable for the caregiver to more quickly retrieve and review information about the user when providing care. For example, in a typical senior living facility, the caregiver may have to scroll through pages of information to arrive at desired information. This is relatively time consuming and, in some cases, may lead to missing pertinent information about the user. Accordingly, the HA system 20 provides contextual information with respect to the user and based upon the HA operation devices 31a-31n.

Figure 3:
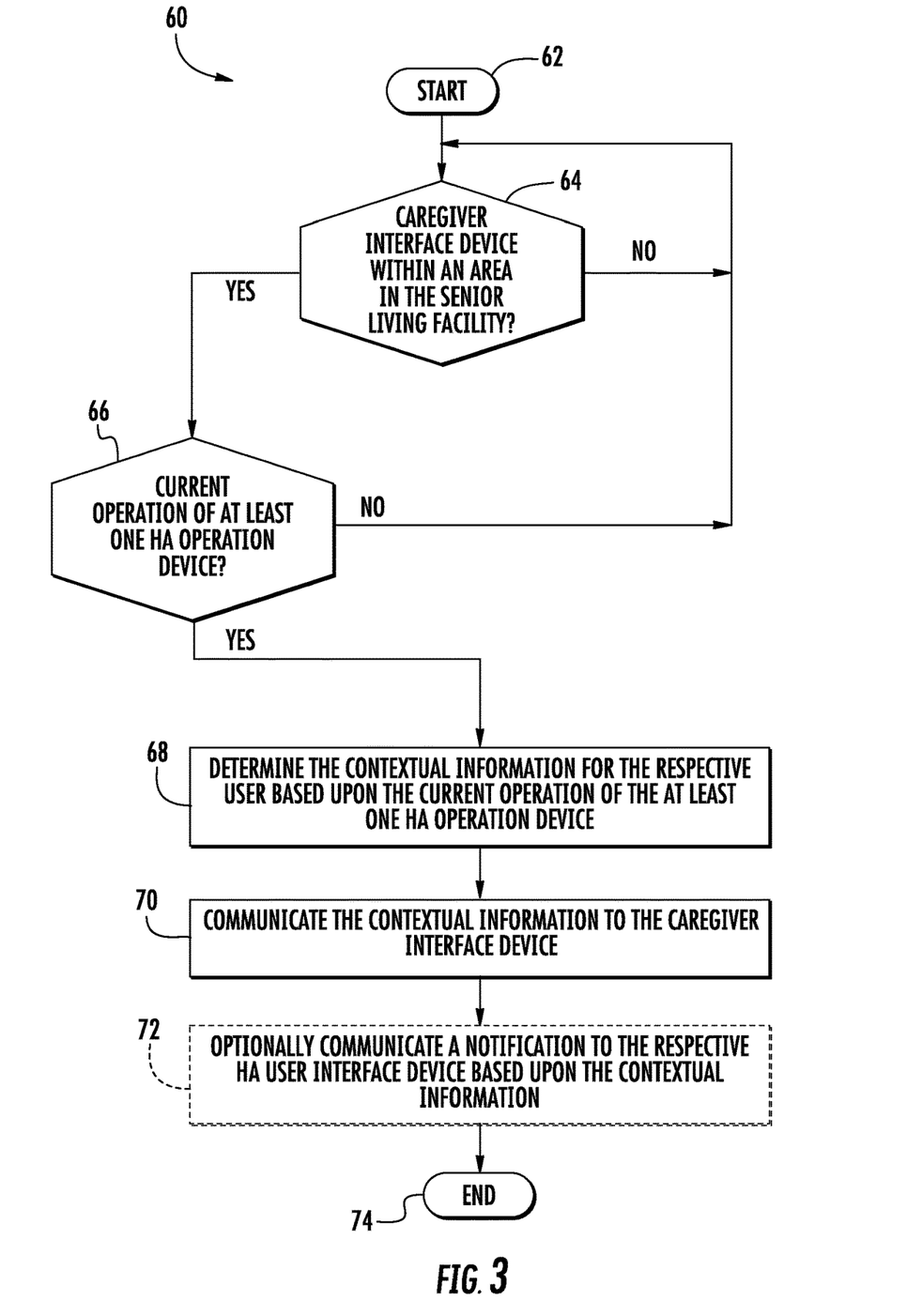
FIG. 3 is a flow chart illustrating operation of the HA system of FIG. 2.

Referring now additionally to the flowchart 60 in FIG. 3, beginning at Block 62, further details of operation of the HA system 20 with respect to the communicating contextual information will now be described. At Block 64, the cloud server 33 cooperates with the caregiver interface device 37 to determine when the caregiver interface device is within a given room or area 22 in the senior living facility 21 associated with the respective user. The cloud server 33 may determine when the caregiver interface device 37 is within the given room based upon communication with certain ones of the HA operation devices 31a-31n. For example, the caregiver interface device 37 may communicate with various HA operation devices 31a-31n whose geographic location is known by the cloud server 33, and based upon this communication, the cloud server may determine when the caregiver interface device is in the given room. Alternatively or additionally, the cloud server 33 may determine when the caregiver interface device 37 is in the given room based upon any of a geographic position determining device (e.g., GPS), signal strength within the network, and/or other position determining techniques as will be appreciated by those skilled in the art. If the caregiver interface device 37 is not in the given room 22 the cloud server 33 may poll the caregiver interface device 37 or devices until it is within the given room.

When the caregiver interface device 37 is determined to be in the given room (Block 64), the cloud server 33 determines a current operation of one or more HA operation devices 31a-31n (Block 66). For example, the cloud server 33 may determine operation of a light switch 31a in a given area 22. Moreover, where one of the HA operation devices 31a-31n includes a medication container, the cloud server 33 may determine operation of the medication container associated with the respective user. Where one of the HA operation devices 31a-31n includes an occupancy sensor, the cloud server 33 may determine when the respective user is in or out of his or her room or a given area 22 (e.g., bedroom, living room, etc.).

The cloud server 33 may consider a current operation of the HA operation devices 31a-31n to be within a threshold time period of an actual operation as communicated to the cloud server. For example, any actual operation of the HA operation devices 31a-31n within the last 0-30 seconds may be considered a current operation. If there are no current operations of an HA operation device 31a-31n, the cloud server 33 may perform a polling operation, for example, by determining if the caregiver interface device 37 is within the room 22 (Block 64) and again determining a current operation (Block 66).

At Block 68, the cloud server 33 determines the contextual information for the respective user based upon the current operation of the given HA operation device or devices 31a-31n. In the medication container example described above, the cloud server 33 may determine medication information (i.e., contextual information) (e.g., name, dosage information, time information, etc.) based upon operation of the medication container. In the light switch example described above, the cloud server 33 may determine respective user activities within the given room or area 22 based upon operation of the light switch. For example, where the area 22 is a bedroom, the cloud server 33 may determine sleep pattern information (e.g., based upon motion sensor(s)). In another example, where the area 22 is a bathroom, the cloud server 33 may determine bathroom usage information (e.g., based upon motion sensor(s)). In the occupancy sensor example above, the cloud server 33 may determine physical activities for the respective user, for example, where the area is a shower, the cloud server may determine shower usage information based upon operation of the occupancy sensor.

At Block 70, the cloud server 33 communicates, for example, wirelessly, the contextual information to the caregiver interface device 37. The caregiver interface device 37 may display the contextual information on a display 43 thereof.

In some embodiments, at Block 72, the cloud server 33 may optionally communicate a notification to the respective HA user interface device 36a-36n based upon the contextual information before ending at Block 74. The notification may be a reminder for the respective user to perform an action associated with the contextual information, for example, take medication, sleep, use the shower, etc. The notification may be in the form of an email, notification badge, SMS message, etc.

In some embodiments, the cloud server 33 may also learn contextual information based upon input to the caregiver interface device. The cloud server 33 may also learn contextual information based upon the HA operation devices 31a-31n over time. For example, the caregiver may manually enter notes or other information that is used by the cloud server 33 along with collected data from the HA operation devices 31a-31n over time to learn contextual information. As will be appreciated by those skilled in the art, the HA system 20 may be particularly advantageous for providing what may be considered the most relevant information (e.g., healthcare information) about a respective user to a caregiver.

Several implementation examples will now be described. In a first example, if a caregiver (and thus caregiver interface device) is geographically located in a user's room, initially, general information about the user may be displayed. The general information may include name, age, family member information, pet information, recent life events, etc. If the caregiver turns on a light in the bedroom, information with respect to sleep may be displayed on the caregiver interface device 37. If the caregiver interacts with a medication container or pill dispenser, associated medication information can be displayed on the caregiver interface device 37.

This contextual information may be refined by observing user interactions with the caregiver interface device 37 along with information from HA operation devices 31a-31n to form future contexts (i.e., learning). For example, a caregiver may interact with a medication container or pill dispenser and set, via input to the caregiver interface device 37, a medication reminder. The cloud server 33 may learn this context, and the next time automatically display medication information upon operation of the medication container. If a caregiver provides a bath to a user, the caregiver may be prompted to confirm the bath and record it. Thereafter, contextual information may be provided or displayed on the caregiver interface device 37 to alert that medication is to be administered after the bath. The caregiver interface device 37 may prompt, e.g., after data is collected from the HA operation devices 31a-31n, the caregiver to identify the activity associated with the current operation of the HA operation devices and recognize that activity in the future.

The learning of the cloud server 33 may be applied to any number of HA operation devices 31a-31n. For example, current operation of three HA operation devices 31a-31n may be determined by the cloud server 33 and based upon the actions of the caregiver in the area or room 22 as input to the caregiver interface device 37, the next time the same three HA operation devices 31a-31n are determined to be currently operated, the cloud server will communicate the relevant contextual information to the caregiver interface device.

A method aspect is directed to a method of communicating contextual information to at least one caregiver interface device 37 in an HA system 20 for a senior living facility 21. The HA system 20 includes a cloud server 33, HA operation devices 31a-31n within the senior living facility 21, and HA user interface devices 36a-36n for respective users within the senior living facility. Each HA user interface device 36a-36n is configured to wirelessly communicate with at least one of the HA operation devices 31a-31n and the cloud server 33. The HA system 20 also includes HA hub devices 34a-34n within the senior living facility 21 to provide communications for the HA user interface devices 36a-36n, the HA operation devices 31a-31n, and the cloud server 33. The method includes using the at least one caregiver interface device 37 to cooperate with the cloud server 33 to display the contextual information for a respective user. The method also includes using the cloud server 33 to cooperate with the caregiver interface device 37 to determine when the caregiver interface device is within a room 22 in the senior living facility 21 associated with the respective user, and when so, determine a current operation of a given HA operation device 31a-31n, determine the contextual information for the respective user based upon the current operation of the given HA operation device, and communicate the contextual information to the caregiver interface device.

While the HA system 20 has been described with respect to operations of the cloud server 33, it should be appreciated by those skilled in the art that the operations of the cloud server may be performed at a respective HA hub device 34a-34n, other server at the senior living facility 21, and/or shared between the cloud server and the HA hub device. Moreover, while a caregiver interface device 37 has been described, the operations described herein may be performed on more than one caregiver interface device. For example, the contextual information may be provided to more than one caregiver interface device 37 for a given user. Also, the HA system 20 may operate with at least one caregiver interface device 37 for respective users or for respective caregivers. Still further, the cloud server 33 may determine current operations and the contextual information based upon any number of HA operation devices 31a-31n.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A home automation (HA) system for a senior living facility comprising:

a cloud server;

a plurality of HA operation devices within the senior living facility, each having a known geographic location within the senior living facility, and at least one HA operation device being selectively switchable between operational states;

a plurality of HA user interface devices for respective users within the senior living facility, each HA user interface device configured to wirelessly communicate with the cloud server to communicate usage data and communicate with the at least one HA operation device for selective switching between the operational states;

a plurality of HA hub devices within the senior living facility to provide communications for the plurality of HA user interface devices, the plurality of HA operation devices, and the cloud server; and at least one caregiver interface device associated with a caregiver and configured to cooperate with the cloud server to display contextual information for a respective user;

the cloud server configured to cooperate with the at least one caregiver interface device to determine when the at least one caregiver interface device is within a user's room in the senior living facility associated with the respective user when the caregiver is providing care to the respective user in the user's room and based upon communication with at least one corresponding HA operation device of the plurality thereof having the known geographic location to correspond to the user's room, and when so, obtain a time of actual operation of the at least one HA operation device between the operational states, determine a current operation of the at least one HA operation device between the operational states when the time of actual operation is within a threshold time period of determining the current operation, otherwise perform a polling operation for the current operation based upon the at least one caregiver interface device being within a user's room, determine the contextual information for the respective user based upon the current operation of the at least one HA operation device and the usage data, communicate the contextual information to the at least one caregiver interface device when the caregiver is providing care to the respective user in the user's room and cooperate with the at least one caregiver interface device to prompt the caregiver to identify an activity associated with the current operation of the at least one HA operation device for recognition of activity upon a same operation of the at least one HA operation device, and communicate a notification to a respective HA user interface device from among the plurality thereof based upon the contextual information.

2. The HA system of claim 1 wherein at least one of the plurality of HA operation devices comprises a medication container associated with the respective user; wherein the contextual information comprises medication usage information; and wherein the cloud server is configured to communicate the contextual information based upon operation of the medication container.

3. The HA system of claim 1 wherein at least one of the plurality of HA operation devices comprises a light switch in an area in the senior living facility; wherein the contextual information comprises activities for the respective user within the area; and wherein the cloud server is configured to communicate the contextual information to the at least one caregiver interface device based upon operations of the light switch.

4. The HA system of claim 3 wherein the area comprises a bedroom; and wherein the contextual information comprises sleep information.

5. The HA system of claim 3 wherein the area comprises a bathroom; and wherein the contextual information comprises bathroom usage information.

6. The HA system of claim 1 wherein at least one of the plurality of HA operation devices comprises an occupancy sensor in an area in the senior living facility; wherein the contextual information comprises physical activities for the respective user within the area; and wherein the cloud server is configured to communicate the contextual information to the at least one caregiver interface device based upon operations of the occupancy sensor.

7. The HA system of claim 6 wherein the area comprises a shower; and wherein the contextual information comprises shower usage information.

8. The HA system of claim 1 wherein the notification comprises a reminder for the respective user to perform an action associated with the contextual information.

9. The HA system of claim 1 wherein the cloud server is configured to learn the contextual information based upon at least one of the plurality of HA operation devices over time.

10. The HA system of claim 9 wherein the cloud server is configured to learn the contextual information based upon input to the at least one caregiver interface device.

11. The HA system of claim 1 wherein the plurality of HA user interface devices comprises a plurality of tablet computers.

12. The HA system of claim 1 wherein the plurality of HA operation devices comprises a plurality of internet of things (IoT) devices.

13. The HA system of claim 1 wherein the contextual information comprises health information for the respective user.

14. The HA system of claim 1 wherein the contextual information comprises family member information for the respective user.

15. A cloud server for a home automation (HA) system for a senior living facility comprising a plurality of HA operation devices within the senior living facility and each having a known geographic location within the senior living facility, and at least one HA operation device being selectively switchable between operational states, a plurality of HA user interface devices for respective users within the senior living facility, each HA user interface device configured to wirelessly communicate with the cloud server to communicate usage data and communicate with the at least one HA operation device for selective switching between the operational states, and a plurality of HA hub devices within the senior living facility to provide communications for the plurality of HA user interface devices, the plurality of HA operation devices, and the cloud server, and at least one caregiver interface device associated with a caregiver and to cooperate with the cloud server to display contextual information for a respective user, the cloud server comprising:

a processor and a memory coupled thereto and configured to
    cooperate with the at least one caregiver interface device to determine when the at least one caregiver interface device is within a user's room in the senior living facility associated with the respective user when the caregiver is providing care to the respective user in the user's room and based upon communication with at least one corresponding HA operation device of the plurality thereof having the known geographic location to correspond to the user's room, and when so,
    obtain a time of actual operation of the at least one HA operation device between the operational states,
    determine a current operation of the at least one HA operation device between the operational states when the time of actual operation is within a threshold time period of determining the current operation, otherwise perform a polling operation for the current operation based upon the at least one caregiver interface device being within a user's room,
    determine the contextual information for the respective user based upon the current operation of the at least one HA operation device and the usage data,
    communicate the contextual information to the at least one caregiver interface device when the caregiver is providing care to the respective user in the user's room and cooperate with the at least one caregiver interface device to prompt the caregiver to identify an activity associated with the current operation of the at least one HA operation device for recognition of activity upon a same operation of the at least one HA operation device, and
    communicate a notification to a corresponding HA user interface device from among the plurality thereof based upon the contextual information.

16. The cloud server of claim 15 wherein at least one of the plurality of HA operation devices comprises a medication container associated with the respective user; wherein the contextual information comprises medication usage information; and wherein the processor is configured to communicate the contextual information based upon operation of the medication container.

17. The cloud server of claim 15 wherein at least one of the plurality of HA operation devices comprises a light switch in an area in the senior living facility; wherein the contextual information comprises activities for the respective user within the area; and wherein the processor is configured to communicate the contextual information to the at least one caregiver interface device based upon operations of the light switch.

18. The cloud server of claim 17 wherein the area comprises a bedroom; and wherein the contextual information comprises sleep information.

19. The cloud server of claim 17 wherein the area comprises a bathroom; and wherein the contextual information comprises bathroom usage information.

20. The cloud server of claim 15 wherein at least one of the plurality of HA operation devices comprises an occupancy sensor in an area in the senior living facility; wherein the contextual information comprises physical activities for the respective user within the area; and wherein the processor is configured to communicate the contextual information to the at least one caregiver interface device based upon operations of the occupancy sensor.

21. The cloud server of claim 15 wherein the processor is configured to learn the contextual information based upon at least one of the plurality of HA operation devices over time.

22. A method of communicating contextual information to at least one caregiver interface device in a home automation (HA) system for a senior living facility comprising a cloud server, a plurality of HA operation devices within the senior living facility each having a known geographic location within the senior living facility, and at least one HA operation device being selectively switchable between operational states, a plurality of HA user interface devices for respective users within the senior living facility, each HA user interface device configured to wirelessly communicate with the cloud server to communicate usage data and communicate with the at least one HA operation device for selective switching between the operational states, and a plurality of HA hub devices within the senior living facility to provide communications for the plurality of HA user interface devices, the plurality of HA operation devices, and the cloud server, the method comprising:

using the at least one caregiver interface device associated with a caregiver to cooperate with the cloud server to display the contextual information for a respective user; and using the cloud server to cooperate with the at least one caregiver interface device to determine when the at least one caregiver interface device is within a user's room in the senior living facility associated with the respective user when the caregiver is providing care to the respective user in the user's room and based upon communication with at least one corresponding HA operation device of the plurality thereof having the known geographic location to correspond to the user's room, and when so, obtain a time of actual operation of the at least one HA operation device between the operational states, determine a current operation of the at least one HA operation device between the operational states when the time of actual operation is within a threshold time period of determining the current operation, otherwise perform a polling operation for the current operation based upon the at least one caregiver interface device being within a user's room, determine the contextual information for the respective user based upon the current operation of the at least one HA operation device and the usage data, communicate the contextual information to the at least one caregiver interface device when the caregiver is providing care to the respective user in the user's room and cooperate with the at least one caregiver interface device to prompt the caregiver to identify an activity associated with the current operation of the at least one HA operation device for recognition of activity upon a same operation of the at least one HA operation device, and communicate a notification to a respective HA user interface device from among the plurality thereof based upon the contextual information.

23. The method of claim 22 wherein at least one of the plurality of HA operation devices comprises a medication container associated with the respective user; wherein the contextual information comprises medication usage information; and wherein the cloud server is used to communicate the contextual information based upon operation of the medication container.

24. The method of claim 22 wherein at least one of the plurality of HA operation devices comprises a light switch in an area in the senior living facility; wherein the contextual information comprises activities for the respective user within the area; and wherein the cloud server is used to communicate the contextual information to the at least one caregiver interface device based upon operations of the light switch.

25. The method of claim 24 wherein the area comprises a bedroom; and wherein the contextual information comprises sleep information.

26. The method of claim 24 wherein the area comprises a bathroom; and wherein the contextual information comprises bathroom usage information.

27. The method of claim 22 wherein at least one of the plurality of HA operation devices comprises an occupancy sensor in an area in the senior living facility; wherein the contextual information comprises physical activities for the respective user within the area; and wherein the cloud server is used to communicate the contextual information to the at least one caregiver interface device based upon operations of the occupancy sensor.

28. The method of claim 22 wherein the cloud server is used to learn the contextual information based upon at least one of the plurality of HA operation devices over time.

* * * * *